(12) United States Patent
Danz

(10) Patent No.: US 8,358,719 B2
(45) Date of Patent: Jan. 22, 2013

(54) METHOD AND DEVICE FOR THE COMPENSATION OF SIGNAL ERRORS IN IQ-MODULATORS

(75) Inventor: Joachim Danz, Ohobrunn (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 1186 days.

(21) Appl. No.: 11/630,319

(22) PCT Filed: May 6, 2005

(86) PCT No.: PCT/EP2005/004922
§ 371 (c)(1),
(2), (4) Date: Jun. 26, 2007

(87) PCT Pub. No.: WO2005/125143
PCT Pub. Date: Dec. 29, 2005

(65) Prior Publication Data
US 2007/0253510 A1    Nov. 1, 2007

(30) Foreign Application Priority Data
Jun. 21, 2004    (DE) .......................... 10 2004 029 932

(51) Int. Cl.
*H04L 27/20* (2006.01)
*H04L 27/36* (2006.01)
*H03C 3/38* (2006.01)

(52) U.S. Cl. ........ 375/298; 375/295; 375/316; 375/300; 375/320; 332/103; 332/120; 332/149

(58) Field of Classification Search .................. 375/219, 375/285, 284, 295, 296, 316, 317, 340, 354, 375/358, 300, 302, 322, 324, 326, 320, 339; 332/103, 115, 112, 117, 120, 138, 139, 149, 332/151, 144, 145

See application file for complete search history.

(56) References Cited

U.S. PATENT DOCUMENTS

| | | | | |
|---|---|---|---|---|
| 4,885,551 A | * | 12/1989 | Myer | 330/52 |
| 5,770,971 A | * | 6/1998 | McNicol | 330/52 |
| 6,421,397 B1 | * | 7/2002 | McVey | 375/308 |
| 6,570,933 B1 | * | 5/2003 | Makinen | 375/296 |

(Continued)

FOREIGN PATENT DOCUMENTS
DE    19934215    3/2001

OTHER PUBLICATIONS

Lohtia et al. "An Adaptive Digital Technique For Compensating For Analog Quadrature Modulator/Demodulator Impairments," *IEEE Pac Rim*, 447-450 (1993).
International Search Report PCT/EP2005/004922, mailed Sep. 15, 2005 (English).

(Continued)

*Primary Examiner* — Sam K Ahn
*Assistant Examiner* — Linda Wong
(74) *Attorney, Agent, or Firm* — Marshall, Gerstein & Borun LLP

(57) ABSTRACT

A method and device for the simultaneous compensation of several signal errors that occur in an IQ-modulator, using respective inverse correction signals, wherein the optimized signal magnitude of each correction signal is calculated by the determination of the effective signal error and by the subsequent iterative minimization of the effective signal error.

14 Claims, 3 Drawing Sheets

U.S. PATENT DOCUMENTS

| | | | |
|---|---|---|---|
| 6,574,286 B2 * | 6/2003 | McVey | 375/308 |
| 6,898,252 B1 * | 5/2005 | Yellin et al. | 375/296 |
| 6,934,341 B2 * | 8/2005 | Sahlman | 375/297 |
| 7,266,159 B2 * | 9/2007 | Vella-Coleiro | 375/296 |
| 2002/0048326 A1 * | 4/2002 | Sahlman | 375/297 |
| 2002/0191713 A1 * | 12/2002 | McVey | 375/308 |
| 2003/0174783 A1 * | 9/2003 | Rahman et al. | 375/298 |

OTHER PUBLICATIONS

International Preliminary Report On Patentability for PCT/EP2005/004922, including claims annex and written opinion of search authority, completed Aug. 28, 2006 (English and German).

* cited by examiner

METHOD AND DEVICE FOR THE COMPENSATION OF SIGNAL ERRORS IN IQ-MODULATORS

BACKGROUND OF THE INVENTION

1. Field of the Invention

The invention relates to a method and a device for simultaneous compensation of signal errors in IQ modulators.

2. Related Technology

IQ modulators are used in modern data transmission systems for the modulation of unmodulated high-frequency carriers. By contrast with traditional modulation methods, which generate a real-value bandpass signal, IQ modulators can, in principle, generate a complex bandpass signal in the intermediate-frequency or high-frequency range. Accordingly, the generation of any required vectors in the intermediate-frequency or high-frequency range allows a better exploitation of the available bandwidth by comparison with a real-value modulation method.

In practice, especially in the case of IQ modulators realized in an analog manner, generating any vector at the complex intermediate-frequency or high-frequency level with an accuracy required for data transmission is problematic. Because of the analog circuit realisation of the IQ modulators, undesirable static signal errors occur, which are superimposed in a static manner over the individual input signals of the IQ modulators and lead to a permanently error-laden complex signal at the output of the IQ modulator, which can be detected in the complex status diagram as a displacement of the vector of the complex output signal.

In essence, the following static signal errors can be listed:

input offset error: with an uncontrolled, in-phase and quadrature-phase channel, the baseband signals of the in-phase and quadrature-phase channel provide a value other than zero and cause a non-optimal attenuation of the respective carrier signal;

high-frequency crosstalk: the carrier signal talks over the bandpass signal at the output of the IQ modulator via the two multiplication units of the IQ modulator;

non-linear modulation: different amplitudes occur in the side bands of the complex baseband signal, because of unavoidable non-linearities—especially non-linearity-differences—between the two multiplication units of the IQ modulator;

residual carrier: one side band of the bandpass signal is incompletely attenuated for a single-sideband transmission because of an incorrectly-dimensioned bandpass filter at the output of the IQ modulator;

amplification error in the baseband: the sensitivity of the amplification elements at the in-phase and quadrature-phase input of the IQ modulator is incorrectly adjusted and/or calibrated and, in particular, is designed asymmetrically;

amplification error in the multiplication units: the sensitivity of the two multiplication units of the IQ modulator is incorrectly adjusted and/or calibrated and, in particular, is designed asymmetrically;

quadrature error: the output signals of the two multiplication units of the IQ modulator are not mutually orthogonal because of phase distortions of the two carrier signals of the in-phase and quadrature-phase signal;

phase error: the in-phase and quadrature-phase signal do not have the same phase error, for example, because of an incorrect carrier recovery or clock-pulse synchronisation.

Since several of these named, static signal errors have an identical effect on the bandpass signal at the output of the IQ modulator and are superimposed in a linear manner and cannot therefore be identified separately by the measurement technology, it is meaningful to combine static signal errors with the same effect on the bandpass signal into signal error types. In principle, there are three types of static signal error:

signal errors with additive effect on the bandpass signal: input-offset errors, high-frequency crosstalk, non-linear modulation, residual carrier;

signal errors with multiplicative effect on the bandpass signal: amplification errors in the baseband, amplification errors in the multiplication units;

signal errors with effect on the phase of the bandpass signal: quadrature errors, phase errors.

All of the listed static signal errors lead to an incorrect interpretation of the transmission signal in the receiver of the data transmission system. If it is not possible to minimise the effect of these signal errors, which reduce the quality of the data transmission, restricting the data-transmission bandwidth is the only expedient solution. Since these static signal errors can hardly be removed at an economically-viable cost by means of circuit technology, and restricting the data-transmission bandwidth is generally not acceptable, the only feasible goal is to compensate such signal errors by means of compensation or correction networks.

For example, DE 199 34 215 C1 presents an arrangement for the compensation of static signal errors, which are generated in IQ modulators. Corresponding to the three types of signal errors, an adding unit and a multiplication unit with additive and multiplicative effect is integrated in each case in the in-phase and quadrature-phase channel in order to compensate the signal errors. To remove the signal errors with effect on the phase of the bandpass signal, an additional control input is provided on the phase modifier in order to realise mutually-orthogonal carrier signals. The two addition and multiplication units and also the control input on the phase modifier are controlled via a controller with corresponding correction values in order to compensate the individual signal errors. A reconstruction of the in-phase and quadrature-phase signal from the bandpass signal at the output of the IQ modulator via an equivalent IQ demodulator and an appropriate implementation of control algorithms within the controller allows the compensation of static signal errors.

An optimum compensation of the individual signal errors requires the absolute measurement of each individual signal error or alternatively the measurement and/or determination of each individual effective signal error as a difference between the individual signal errors and the associated correction signal. This is not possible with the arrangement disclosed in DE 199 34 215 C1, because the error-laden in-phase and quadrature-phase signals recovered in the IQ demodulator are supplied to the controller as actual-value signals. A measurement of the individual signal errors from the in-phase and quadrature-phase signals recovered is not disclosed in that document. Additionally, for an optimum compensation of individual signal errors, the associated correction errors must be generated in a decoupled manner for each individual signal error on the basis of the difference between the signal error and the correction signal. This is also not disclosed in the document DE 199 34 215 C1, because this document does not disclose a compensation of the respective effective signal error in a decoupled manner for each individual signal error as a mutually-decoupled compensation of the difference between the individual signal error and the respectively associated correction signal in the description of the controller.

SUMMARY OF THE INVENTION

The invention therefore provides a method and a device for simultaneous compensation of all signal errors generated in an IQ modulator, wherein the difference between a signal error and the associated correction signal should be determined and minimised in a mutually-decoupled manner in order to achieve an optimized compensation of each individual signal error.

According to a method according to the invention, the effective signal error is determined as the difference between the respective signal error and the associated correction signal from a complex baseband model, which is generated for each of the signal errors with the impressions of the determined correction signals for the IQ modulator and an upstream correction circuit. If a number, corresponding to the number of unknowns, of signal values of the two impressed modulation signals and of the measured bandpass signal dependent thereon, is fed into the complex baseband model of the IQ modulator and the correction circuit connected upstream at the output of the IQ modulator, all of the unknowns and all effective signal errors contained therein can be determined by resolving this resulting equation system.

Since the equation system of the complex baseband model contains nonlinear equations, a numerical solution pathway should be aimed for. Numerical iteration methods, such as the Newton method or the Brodyn method are particularly suitable in this context.

In order to minimize the effective signal error in each case, a gradient method, wherein the respective effective signal error is minimized iteratively towards a predetermined threshold value, should be used in a second stage of the method according to the invention.

The invention also provides a correction device with a correction circuit including several correction elements for the compensation of signal errors occurring in an IQ modulator and with a processor unit for determining each correction signal associated with the respective correction element from measurement signals and adjustment signals, wherein that the adjustment signals are an in-phase modulation signal impressed respectively at one of two inputs of the IQ modulator and quadrature-phase modulation signal impressed at the other of the two inputs of the IQ modulator, and the measurement signal is an intermediate-frequency or high-frequency bandpass signal measured at an output of the IQ modulator.

In modelling the complex baseband model of the IQ modulator and the correction circuit connected upstream, it should be taken into consideration that there are several signal errors, which have the same effect on the individual input signals of the IQ modulator and cannot therefore be separated by measurement technology. Accordingly, only signal errors, which are superimposed respectively in an additive or multiplicative manner over the in-phase or quadrature-phase signal or which influence the phase of the two carrier signals of the IQ modulator, should be modelled in the baseband model.

BRIEF DESCRIPTION OF THE DRAWINGS

One embodiment of the method according to the invention and the device according to the invention for simultaneous compensation of signal errors generated in IQ modulators is explained in greater detail below with reference to the drawings. The drawings are as follows.

DETAILED DESCRIPTION

Figure 1:
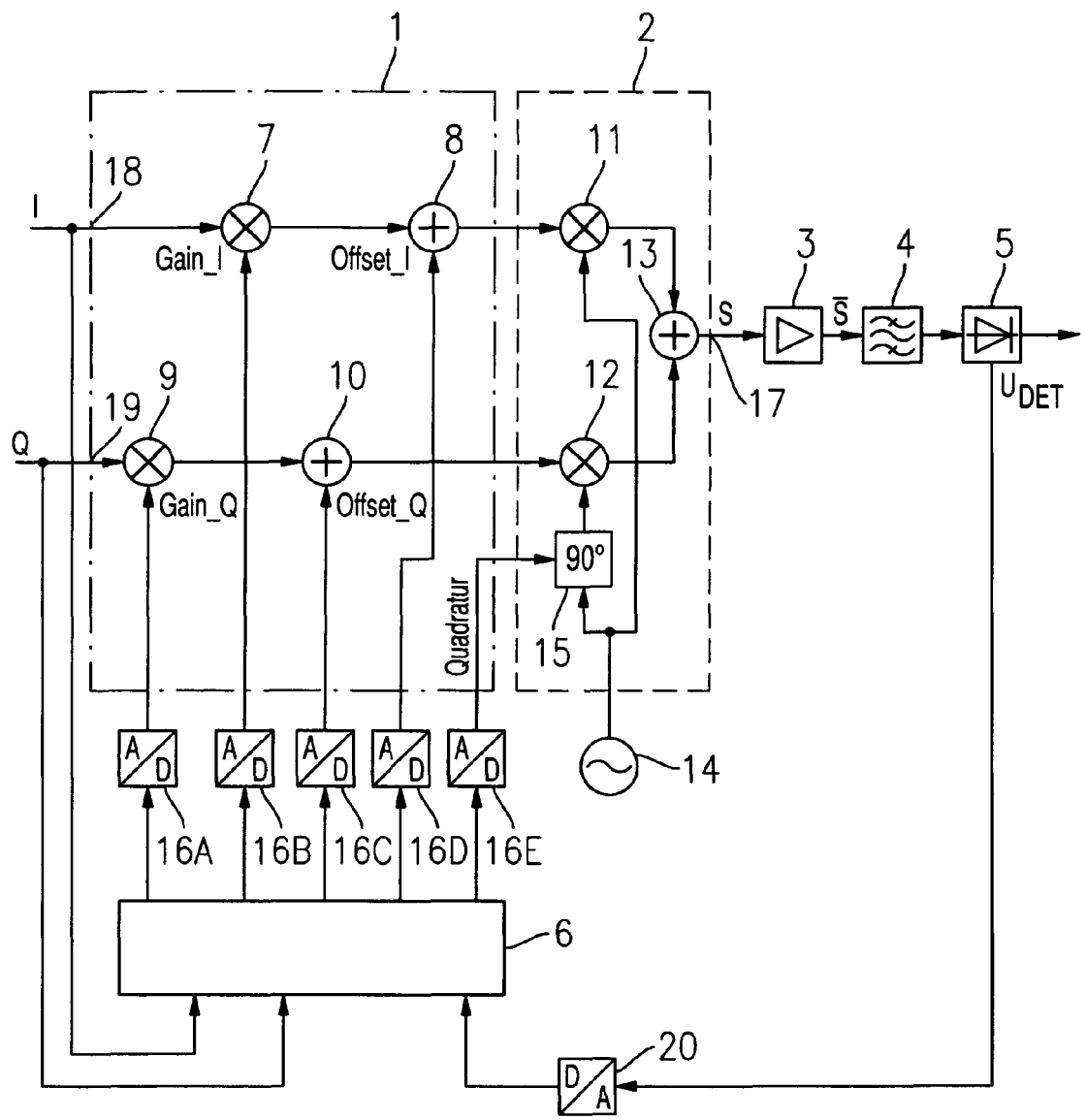
FIG. 1 shows a block circuit diagram of the device according to the invention for simultaneous compensation of signal errors generated in IQ modulators.

As shown in FIG. 1, the device according to the invention for simultaneous compensation of signal errors generated in IQ modulators comprises a correction circuit 1, an IQ modulator 2 connected downstream, a subsequent high-frequency amplifier 3, a bandpass filter 4, high-frequency detector 5, and a processor unit 6.

The in-phase modulation signal I and the quadrature-phase modulation signal Q are supplied to the correction circuit 1. The correction circuit 1 contains as correction elements a first amplification element 7 for the amplification of the in-phase modulation signal I with the correction signal Gain_I and a subsequent, first adding unit 8 for the addition to the in-phase modulation signal I of the correction signal Offset_I, a second amplification element 9 for the amplification of the quadrature-phase modulation signal Q with a correction signal Gain_Q and finally a subsequent, second adding unit 10 for the addition to the quadrature-phase modulation signal Q of the correction signal Offset_Q. Finally, the correction circuit 1 also contains the correction signal quadrature for phase modification of the two mutually-orthogonal carrier signals Lo and Lo*.

In the IQ modulator 2, which is connected downstream of the correction circuit 1, the in-phase modulation signal I corrected by the two correction signals Gain_I and Offset_I is supplied to a first multiplication unit 11, in which the in-phase modulation signal I is converted from the baseband via the first carrier signal Lo supplied to the first multiplication unit 11 into the intermediate-frequency or high-frequency bandpass range. Similarly, the quadrature-phase modulation signal Q corrected by the two correction signals Gain_Q and Offset_Q is supplied to a second multiplication unit 12, in which the quadrature-phase modulation signal Q is converted from the baseband into the intermediate frequency or high-frequency bandpass range via the second carrier signal Lo* supplied to the second multiplication unit 12, of which the phase is in quadrature to the first carrier signal Lo. The two in-phase and quadrature-phase modulation signals I and Q converted into the intermediate frequency or high-frequency bandpass range are finally added in an adding unit 13 of the IQ modulator 2 to the output signal S of the IQ modulator 2. The carrier signal Lo is generated in a local oscillator 14 and supplied to the first multiplication unit 11. The carrier signal Lo*, which is supplied to the second multiplication unit 12, is generated via a 90° phase modifier 15 from the carrier signal Lo, to which it is orthogonal.

The output signal S of the IQ modulator 2 is transferred to a high-frequency amplifier 3 for amplification to a given signal level. The high-frequency amplifier 3 is generally operated in its linear range so that nonlinear distortions of the intermediate-frequency or high-frequency signal S of the IQ modulator 2 do not occur. The bandpass filter 4 following the high-frequency amplifier 3 generates from the output signal $\overline{S}$ of the high-frequency amplifier 3 an intermediate-frequency or high-frequency bandpass signal, which filters one of the two sidebands out of the intermediate-frequency or high-frequency signal $\overline{S}$ for a single sideband transmission. Finally, the intermediate-frequency or high-frequency bandpass signal $U_{DET}$ is measured via a subsequent high-frequency detector 5. According to the method, the characteristic of the high-frequency detector 5 should provide a strictly monotonous characteristic. In general, a high-frequency detector 5 with a quadratic characteristic is used, wherein the square of the effective value of the intermediate-frequency or high-frequency bandpass signal $\overline{S}$ disposed at its input is determined in this context.

Alongside the in-phase modulation signal I impressed into the correction circuit 1 and the quadrature-phase modulation signal Q, the intermediate-frequency or high-frequency bandpass signal $U_{DET}$ measured by the high-frequency detector 5 is supplied to the processor unit 6. In each case, five or seven signal values of the in-phase modulation signal, the quadrature-phase modulation signal and the intermediate-frequency or high-frequency bandpass signal $U_{DET}$ are supplied to the processor unit 6 for the method according to the invention for simultaneous compensation of signal errors generated in IQ modulators in order to determine the respective correction signals Gain_I, Gain_Q, Offset_I, Offset_Q and quadrature. Since the processor unit 6 is a digitally-operating processor unit, the correction signals Gain_I, Gain_Q, Offset_I, Offset_Q and quadrature disposed digitally at the output of the processor unit 6 are converted via digital-to-analog converters 16A, 16B, 16C, 16D and 16E into corresponding analog values, in order to supply them appropriately to the correction circuit 1, which is realized in an analog manner, and to the IQ modulator 2, which is also realized in an analog manner. Accordingly, the level of the high-frequency baseband signal $U_{DET}$ is supplied to the processor unit 6 via an analog-to-digital converter 20.

Figure 2:
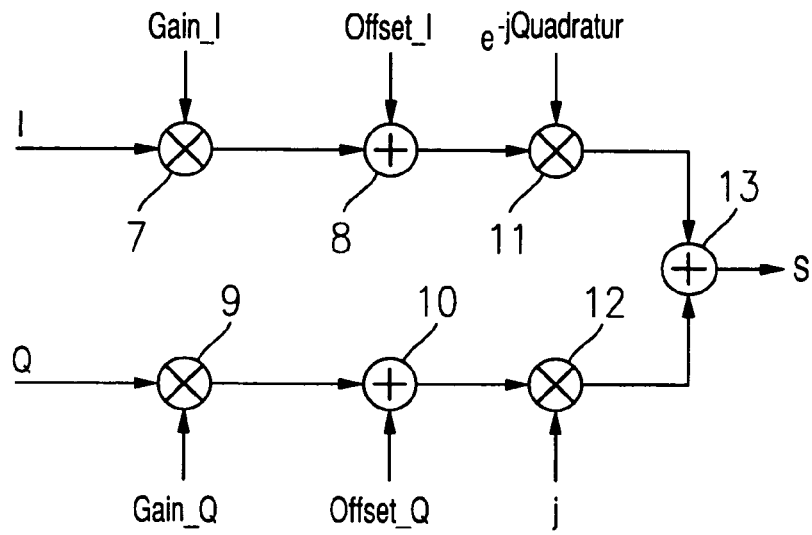
FIG. 2 shows a block circuit diagram for a complex baseband model for the IQ modulator and the correction circuit connected upstream.

A complex baseband model for the transmission path consisting of the correction circuit 1 and the IQ modulator 2 is structured according to FIG. 2 in order to describe the mathematical context between the impressed in-phase and quadrature-phase modulation signals I and Q, the individual signal errors occurring in the IQ modulator 2, the individual correction signals and the measured intermediate-frequency or high-frequency bandpass signal S at the output of the IQ modulator 2.

In the block circuit diagram of the transmission path consisting of the correction circuit 1 and the IQ modulator 2, identical reference numbers are used for identical features of the complex baseband model.

The in-phase modulation signal I is amplified in a first amplification element 7 with a correction signal Gain_I, added in a subsequent, first adding unit 8 to a correction signal Offset_I and multiplied in a subsequent, first multiplication unit 11 by the complex phase element $e^{-j*Quadrature}$ consisting of the correction signal quadrature. similarly, the quadrature-phase modulation signal Q is amplified in a second amplification element 9 with a correction signal Gain_Q, added in a subsequent, second adding unit 10 to a correction signal Offset_Q and multiplied in a subsequent, second multiplication unit 12 by the complex value j. The two output signals of the first and second multiplication unit 11 and 12 are added in a subsequent adding unit 13 to the complex intermediate-frequency or high-frequency output signal S of the IQ modulator 2.

The mathematical context shown in equation (1) is obtained for the complex intermediate-frequency or high-frequency output signal S of the complex baseband model shown in FIG. 2 formed from the correction circuit 1 and the IQ modulator 2.

$$S=(I*Gain\_I+Offset\_I)*e^{-jquadrature}+j*(Q*Gain\_Q+Offset\_Q) \quad (1)$$

In the case of a linear control according to equation (2), the high-frequency amplifier 3 following the complex baseband model consisting of the correction circuit 1 and IQ modulator 2 provides a transmission behavior, which is determined by its amplification factor $V_{HF}$. The output signal $\overline{S}$ of the high-frequency amplifier 3 is obtained according to equation (2):

$$\overline{S}=S*V_{HF} \quad (2)$$

The transmission behavior of the bandpass filter 4 is approximately constant within the range of the frequency band and is modelled with an amplification factor of approximately 1.

The characteristic of the high-frequency detector 5 can either be determined by measurement or provides a mathematical functional relationship. The output signal $U_{DET}$ of the high-frequency detector 5 is accordingly obtained according to equation (3):

$$U_{DET}=f(\overline{S}) \quad (3)$$

For the special case of a quadratic characteristic, as described above, the output signal $U_{DET}$ of the high-frequency detector 5 can be described by equation (3), wherein the characteristic provides an amplification factor $V_{DET}$ and is affected by an offset error $O_{DET}$.

$$U_{DET}=|V_{DET}*\overline{S}S|^2+O_{DET} \quad (4)$$

In the case of a functional relationship of the high-frequency detector 5 according to equation (3), a mathematical relationship according to equation (5) is obtained for the complex intermediate-frequency or high-frequency bandpass signal S, if equations (2) and (3) are inserted into equation (1) in this context.

$$U_{DET}=f(((I*Gain\_I+Offset\_I)*e^{-jquadrature}+j*(Q*Gain\_Q+Offset\_Q))*V_{HF}) \quad (5)$$

If the correction signals Gain_I, Gain_Q, Offset_I and Offset_Q are combined according to equations (6a), (6b), (6c) and (6d) with the amplification factor $V_{HF}$ of the high-frequency amplifier 3, a nonlinear equation with five unknowns according to equation (7) is obtained.

$$G\_I=Gain\_I*V_{HF} \quad (6a)$$

$$G\_Q=Gain\_Q*V_{HF} \quad (6b)$$

$$O\_I=Offset\_I*V_{HF} \quad (6c)$$

$$O\_Q=Offset\_Q*V_{HF} \quad (6d)$$

$$U_{DET}=f((I*G\_I+O\_I)*e^{-jquadrature}+j(Q*G\_Q+O\_Q)) \quad (7)$$

Alternatively, in the case of a high-frequency detector 5 with a quadratic characteristic according to equation (4), a mathematical relationship for the complex intermediate-frequency or high-frequency bandpass signal $U_{DET}$ of the high-frequency detector (5) according to equation (9) can be obtained, if the amplification factor $V_{DET}$ of the high-frequency amplifier 3 is combined according to equation (8) and if equation (1) and equation (2) are inserted into equation (4).

$$V=V_{HF}*V_{DET} \quad (8)$$

$$U_{DET}=|V*((JI*Gain\_I+Offset\_Q)*e^{-quadrature}+j(Q*Gain\_Q+Offset\_Q))|^2+O_{DET} \quad (9)$$

Equation (9) represents a nonlinear equation with seven unknowns.

If the correction circuit 1 and the subsequent IQ modulator 2 are provided at their two inputs with an in-phase modulation signal I and a quadrature-phase modulation signal Q with respectively defined voltage level, and at the same time, the signal level of the resulting intermediate-frequency or high-frequency bandpass signal $U_{DET}$ is measured via the high-frequency detector 5, the total of five unknowns of equation (7) or respectively the total of seven unknowns of equation (9) can be determined by implementing this procedure a total of five times or respectively seven times with five or respectively seven different signal levels of the in-phase modulation signal I, the quadrature phase modulation signal Q and the resulting intermediate-frequency or high-frequency bandpass signal $U_{DET}$. Accordingly, an equation system with a total of five or seven equations, which can be used to determine the total of five or seven unknowns can be obtained from a single equation (7) or (9).

Figure 3:
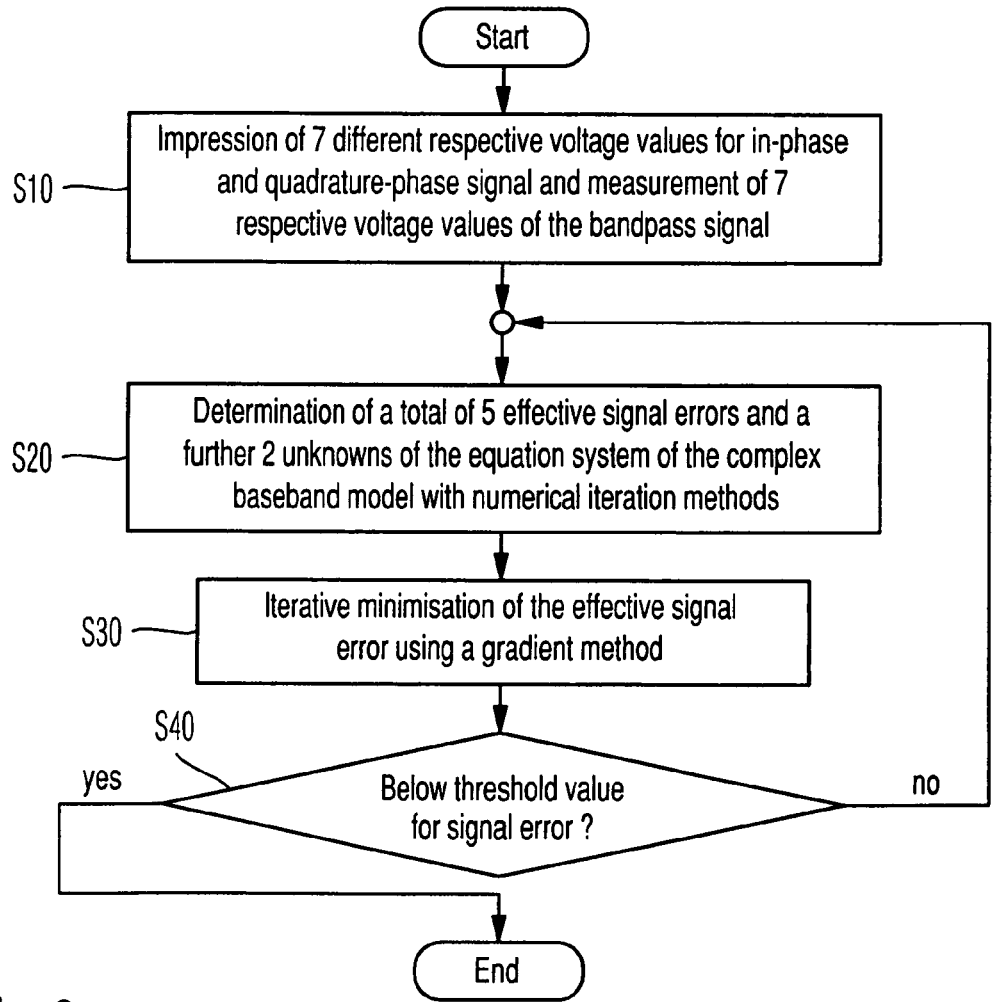
FIG. 3 shows a flow chart for the method according to the invention for simultaneous compensation of signal errors generated in IQ modulators.

This approach therefore provides a solution for the method according to the invention for simultaneous compensation of signal errors generated in IQ modulators according to FIG. 3, which is described below.

In the first procedural stage S10 of the method according to the invention, voltage signals with a defined signal level are connected at the inputs of the in-phase modulation signal I and the quadrature-phase modulation signal Q, and the signal level of the resulting intermediate-frequency or high-frequency bandpass signal $U_{DET}$ is determined at the output of the high-frequency detector 5. In this context, the signal level of the in-phase modulation signal I and the quadrature-phase modulation signal Q should be selected in such a manner that the high-frequency detector 5 is operated in the range of its maximum steepness. This exploits its maximum sensitivity for the measurement. If the two signal levels of the in-phase modulation signal I and the quadrature phase modulation signal Q can be additionally adjusted very accurately by a signal generator, the accuracy of the method according to the invention can be optimised accordingly. In procedural stage S10, this procedure is repeated a total of five times or seven times dependent upon the characteristic of the high-frequency detector 5 used in order to determine the total of five or seven unknowns.

Using the signal level of the in-phase and quadrature-phase modulation signal I and Q impressed and measured in procedural stage S10 and the measured intermediate-frequency or high-frequency bandpass signal $U_{DET}$, the nonlinear equation system based on equation (7) or equation (9) is solved in procedural stage S20 in order to determine the total of five or seven unknowns of the equation system. This equation system is a nonlinear equation system, which cannot be solved analytically. Accordingly, a numerical iteration method, such as the known Newton method or the Brodyn method can be used.

Figure 4:
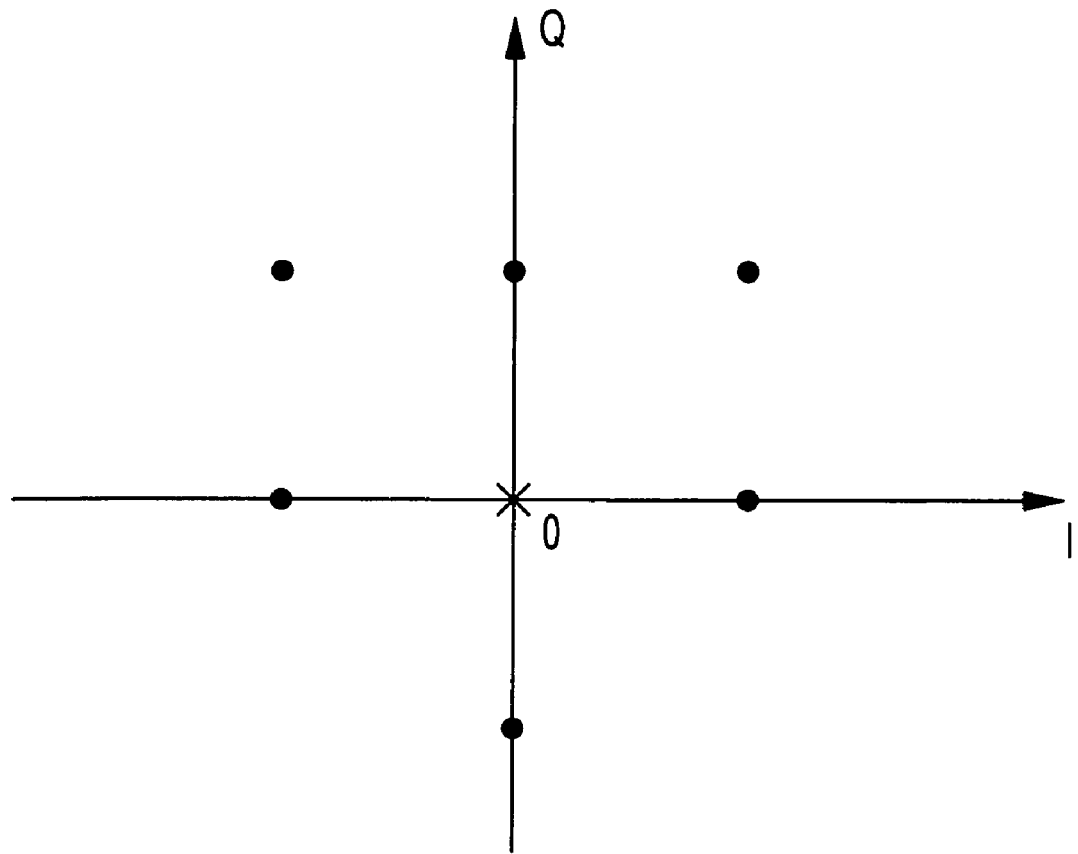
FIG. 4 shows a configuration diagram with IQ start values for the method according to the invention for simultaneous compensation of signal errors generated in IQ modulators.

The value pairs shown in the configuration diagram in FIG. 4 are suitable in the numerical iteration method as starting values for the impressed signal level of the in-phase and quadrature-phase modulation signal I and Q. Within the framework of an error analysis of the numerical iteration method for several different sets of signal levels, the optimal set of signal levels can be determined for the start values of the impressed in-phase and quadrature-phase modulation signal I and Q. The total of five or seven unknowns, which contain respectively the five effective signal errors—signal errors with additive effect on the in-phase and quadrature-phase modulation signal, signal errors with multiplicative effect on the in-phase and quadrature-phase modulation signal and signal errors with effect on the phase of the two carrier signals—is obtained as a solution to the nonlinear equation system.

The minimization of each of these effective signal errors is implemented in the subsequent procedural stage S30. The five-dimensional minimum with the five minima associated with the five respective, effective signal errors is determined in this procedural stage. It must be established that the minimum search in all five dimensions leads unambiguously to an absolute minimum. In this context, an iterative gradient descent method is used. With a gradient descent method, the individual effective signal errors can be minimized in several iterative steps by adjusting the individual correction signals and therefore also the effective signal error, and the optimum signal values can be determined for the individual correction signals. Accordingly, in procedural stage S40, each effective signal error determined iteratively in procedural stage S30 is compared with a threshold value. If the effective signal error determined in the preceding procedural stage S30 falls below the predetermined threshold value, the gradient descent method converges and the respective minimum effective signal error and the optimal signal level of the associated correction signal are found.

Otherwise, if the respective effective signal error does not fall below the predetermined threshold value, the next lowest respective effective signal error in procedural stage S20 must be determined in a further iterative step using the numerical iteration method—e.g. Newton or Brodyn method. The iterative calculation of a new effective signal error by means of the numerical Newton or Brodyn method in procedural stage S20 is continued until all effective signal errors are disposed below their respectively-allocated threshold value in procedural stage S40.

The invention is not restricted to the described embodiment. In particular, different numerical methods for solving the nonlinear equation system and for minimizing the individual effective signal errors are covered by the invention. With regard to the minimization of the individual effective signal error, a controller structure—an analog controller or a digitally-realized control algorithm—which implements the minimization of the effective signal error within the framework of its control difference minimization, is also covered by the invention.

The invention claimed is:

1. Method for simultaneous compensation of several signal errors occurring in an IQ modulator having an output and two inputs with correction signals respectively inverse to said signal errors, the method comprising:
   iteratively determining an optimized signal value of each of a plurality of correction signals by measuring a difference between a signal error in an in-phase modulation signal and a quadrature modulation signal and a correction signal of the plurality of correction signals,
   wherein iteratively determining an optimized signal value comprises determining every difference between the signal error and the correction signal using a complex baseband model on the in-phase modulation signal and on the quadrature-phase modulation signal simultaneously,
   the complex baseband model being of a transmission behavior between an output and two inputs of the IQ modulator and of a correction circuit connected upstream of the IQ modulator; and
   subsequently minimizing the difference between the signal error and the correction signal,
   wherein the complex baseband model is a non-linear equation system with an order corresponding to a number of unknowns contained in the equation system and contains a number, corresponding to the number of unknowns contained in the equation system, of signal values, impressed respectively at the two inputs, for the in-phase modulation signal, the quadrature-phase modulation signal, and an intermediate frequency or high-frequency bandpass signal UDET measured at the output of the IQ modulator, and wherein the equation system is solved with a Newton numerical optimization method or a Brodyn numerical optimization method.

2. Method for compensation according to claim 1, comprising impressing the respective correction signal on the in-phase modulation signal, the quadrature-phase modulation signal or on the two carrier signals of the IQ modulator in the correction circuit connected upstream of the IQ modulator.

3. Method for compensation according to claim 2, comprising adding a first inverse correction signal with signal value optimized to the signal error, which is additively superimposed over the in-phase modulation signal of the IQ modulator, and which is a signal with a sign inverse to the sign of the signal error and an amplitude of the same magnitude as the amplitude of the signal error, added to the in-phase modulation signal.

4. Method for compensation according to claim 2, comprising adding a second inverse correction signal with signal value optimized to the signal error, which is additively superimposed over the quadrature-phase modulation signal of the IQ modulator and which, is a signal with a sign inverse to the sign of the signal error and an amplitude of the same magnitude as the amplitude of the signal error, to the quadrature-phase modulation signal.

5. Method for compensation according to claim 2, comprising multiplying a third inverse correction signal with signal magnitude optimized to the signal error, which is multiplicatively superimposed over the in-phase modulation signal of the IQ modulator, and which is a signal with an amplitude reciprocal to the amplitude of the signal error and is multiplied by the in-phase modulation signal.

6. Method for compensation according to claim 2, comprising multiplying a fourth inverse correction signal with signal magnitude optimized to the signal error, which is superimposed multiplicatively over the quadrature-phase modulation signal of the IQ modulator, and which is a signal with an amplitude reciprocal to the amplitude of the signal error, by the quadrature-phase modulation signal.

7. Method for compensation according to claim 2, comprising supplying a fifth inverse correction signal with signal magnitude optimized to the signal error, which causes a phase difference in the orthogonality of the two carrier signals, and which is a phase signal negative to the phase difference, to a phase modifier in order to adjust the orthogonality of the two carrier signals.

8. Method for compensation according to claim 1, wherein the complex baseband model contains the transmission behavior of a high-frequency amplifier, a bandpass filter and a high-frequency detector connected downstream of the IQ modulator.

9. Method for compensation according to claim 1, comprising iteratively minimizing, for each signal error, the difference between the signal error and the correction signal by means of a gradient method until the difference falls below a predetermined threshold value.

10. Method for compensation according to claim 9, wherein the gradient method is a gradient descent method.

11. Correction device with a correction circuit comprising several correction elements for the compensation of signal errors occurring in an IQ modulator having an output and two inputs and with a processor unit for determining each of a plurality of correction signals associated with a respective correction element from measurement signals and adjustment signals by determining every difference between a signal error in an in-phase modulation signal and a quadrature modulation signal and a correction signal of the plurality of correction signals using a complex baseband model on the phase modulation signal and on the quadrature-phase modulation signal simultaneously, the complex baseband model being of a transmission behavior between an output and two inputs of the IQ modulator and of a correction circuit connected upstream of the IQ modulator, wherein the adjustment signals are an in-phase modulation signal impressed respectively at one of the two inputs of the IQ modulator and a quadrature-phase modulation signal impressed at the other of the two inputs of the IQ modulator, and the measurement signal is an intermediate-frequency or high-frequency bandpass signal measured at the output of the IQ modulator, wherein the correction circuit is connected upstream of the IQ modulator, wherein the complex baseband model is a non-linear equation system with an order corresponding to a number of unknowns contained in the equation system and contains a number, corresponding to the number of unknowns contained in the equation system, of signal values, impressed respectively at the two inputs, for the in-phase modulation signal, the quadrature-phase modulation signal, and an intermediate-frequency or high-frequency bandpass signal UDET measured at the output of the IQ modulator, and wherein the equation system is solved with a Newton numerical optimization method or a Brodyn numerical optimization method.

12. Correction device according to claim 11, wherein the intermediate-frequency or high-frequency bandpass signal is measured at the output of the IQ modulator with a high-frequency detector.

13. Correction device according to claim 12, wherein the high-frequency detector provides a quadratic characteristic.

14. Correction device according to claim 11, wherein the correction elements of the correction circuit are respectively an adding unit for the addition of the in-phase modulation signal and the quadrature-phase modulation signal to the respective correction signal, respectively an amplification or attenuation element for the amplification or attenuation of the in-phase modulation signal and of the quadrature-phase modulation signal with the respective correction signal and a phase modifier for adjusting the phase of the two mutually-orthogonal carrier signals of the IQ modulator with the respective correction signal.

* * * * *